United States Patent
Dai et al.

(10) Patent No.: US 10,212,129 B2
(45) Date of Patent: *Feb. 19, 2019

(54) NETWORK INTERFACE CARD RATE LIMITING

(71) Applicant: Fortinet, Inc., Sunnyvale, CA (US)

(72) Inventors: Zhiwei Dai, Campbell, CA (US); Xu Zhou, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,887

(22) Filed: Mar. 9, 2017

(65) Prior Publication Data

US 2017/0180315 A1 Jun. 22, 2017

Related U.S. Application Data

(63) Continuation of application No. 14/281,170, filed on May 19, 2014, now Pat. No. 9,652,417.

(51) Int. Cl.
| | |
|---|---|
| *G06F 13/22* | (2006.01) |
| *H04L 29/06* | (2006.01) |
| *G06F 13/34* | (2006.01) |
| *G06F 13/16* | (2006.01) |
| *G06F 13/28* | (2006.01) |
| *G06F 9/48* | (2006.01) |
| *G06F 15/78* | (2006.01) |
| *H04L 12/26* | (2006.01) |

(52) U.S. Cl.
CPC ........ *H04L 63/0209* (2013.01); *G06F 9/4887* (2013.01); *G06F 13/1673* (2013.01); *G06F 13/225* (2013.01); *G06F 13/28* (2013.01); *G06F 13/34* (2013.01); *G06F 15/7825* (2013.01); *H04L 43/08* (2013.01); *H04L 43/16* (2013.01); *H04L 63/0272* (2013.01); *G06F 2213/2408* (2013.01); *G06F 2213/2804* (2013.01)

(58) Field of Classification Search
CPC .................................. G06F 13/28; H04L 47/10
USPC ........................................................... 710/29
See application file for complete search history.

(56) References Cited

U.S. PATENT DOCUMENTS

| | | |
|---|---|---|
| 6,697,870 B1 | 2/2004 | Cafarelli, III et al. |
| 6,735,629 B1 | 5/2004 | Cafarelli, III et al. |

(Continued)

OTHER PUBLICATIONS

Notice of Allowance for U.S. Appl. No. 14/281,170 dated Jan. 20, 2017.
Non-Final Rejection for U.S. Appl. No. 14/281,170 dated Sep. 13, 2016.

*Primary Examiner* — Brian T Misiura
(74) *Attorney, Agent, or Firm* — Hamilton, DeSanctis & Cha LLP

(57) ABSTRACT

Systems and methods for limiting the rate of packet transmission from a NIC to a host CPU are provided. According to one embodiment, data packets are received from a network by the NIC. The NIC is coupled to a host central processing unit (CPU) of a network security device through a bus. A status of the host CPU is monitored by the NIC. A rate limiting mode indicator is set by the NIC based on the status. When the rate limiting mode indicator indicates rate limiting is inactive, then the received data packets are delivered or made available to the host CPU for processing. When the rate limiting mode indicator indicates rate limiting is active, then rate limiting is performing by temporarily stopping or slowing the delivery or making available of the received data packets to the host CPU for processing.

27 Claims, 7 Drawing Sheets

(56) References Cited

U.S. PATENT DOCUMENTS

| | | |
|---|---|---|
| 7,937,499 B1 | 5/2011 | Tripathi |
| 8,353,003 B2 | 1/2013 | Noehring et al. |
| 8,406,230 B2 | 3/2013 | Lu et al. |
| 8,661,167 B2 | 2/2014 | Hsin et al. |
| 9,021,138 B2 | 4/2015 | Dabagh et al. |
| 9,348,773 B2 | 5/2016 | Sawal et al. |
| 9,652,417 B2 | 5/2017 | Dai et al. |
| 2010/0153590 A1 | 6/2010 | Hsin et al. |
| 2013/0055270 A1 | 2/2013 | Dabagh et al. |
| 2014/0153388 A1 | 6/2014 | Webb et al. |
| 2014/0359185 A1 | 12/2014 | Sawal et al. |
| 2015/0331815 A1 | 11/2015 | Dai et al. |

NETWORK INTERFACE CARD RATE LIMITING

CROSS-REFERENCE TO RELATED APPLICATIONS

This application is a continuation of U.S. patent application Ser. No. 14/281,170, filed May 19, 2014, now U.S. Pat. No. 9,652,417, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2017, Fortinet, Inc.

BACKGROUND

Field

Embodiments of the present invention generally relate to the field of computer networking. In particular, various embodiments relate to dynamically limiting the rate that a network interface controller (NIC) transmits data packets to a host central processing unit (CPU) of a network appliance.

Description of the Related Art

In a network system, a network appliance, such as a firewall, may control network traffic at the border of a network. The network appliance may include one or more host CPUs and one or more NICs. The NICs are typically coupled to the host CPUs through a bus system. The NICs receive data packets from the network through network links, such as optical fiber cables, and transmit the data packets to the host CPUs through the bus system. The host CPUs may scan the data packets based on policies configured by an administrator of the network. The network appliance allows the data packets to be transmitted to the destinations of the data packets if the data packets comply with the configured policies.

The data packet scanning may be performed within a kernel of an operating system, such as Linux, and typically has a higher priority than user space applications. When the network appliance is experiencing heavy network traffic, a large number of data packets are transmitted from a NIC to a host CPU in a short time. The host CPU may be very busy handling the data packets in the kernel, thereby leaving few, if any, CPU cycles for user space applications or other tasks.

Some user space applications are very critical and have to get some amount of CPU cycles once in a while. Failure by the network appliance to spare some CPU cycles for user space applications and other tasks may cause critical issues. For example, a user of the network appliance may receive a delayed or no response from an application when the operating system is overwhelmed by processing of data packets from the network. In a multi-core system, the problem may still exist because modern NICs support Message Signaled Interrupts Extended (MSI-X) and can deliver data packets to multiple CPUs. As such, during high-traffic periods, even the multiple CPUs of a multi-core system may become weighed down handling processing of data packets in kernel space— again potentially starving user space applications and/or other lower priority tasks.

Therefore, there is a need to limit the rate at which a NIC transmits data packets to a host CPU so that the host CPU may spare some cycles for handling other applications.

SUMMARY

Systems and methods are described for limiting the rate of packet transmission from a NIC to a host CPU. According to one embodiment, data packets are received from a network by the NIC. The NIC is coupled to a host central processing unit (CPU) of a network security device through a bus. A status of the host CPU is monitored by the NIC. A rate limiting mode indicator is set by the NIC based on the status. When the rate limiting mode indicator indicates rate limiting is inactive, then the received data packets are delivered or made available to the host CPU for processing. When the rate limiting mode indicator indicates rate limiting is active, then rate limiting is performing by temporarily stopping or slowing the delivery or making available of the received data packets to the host CPU for processing.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
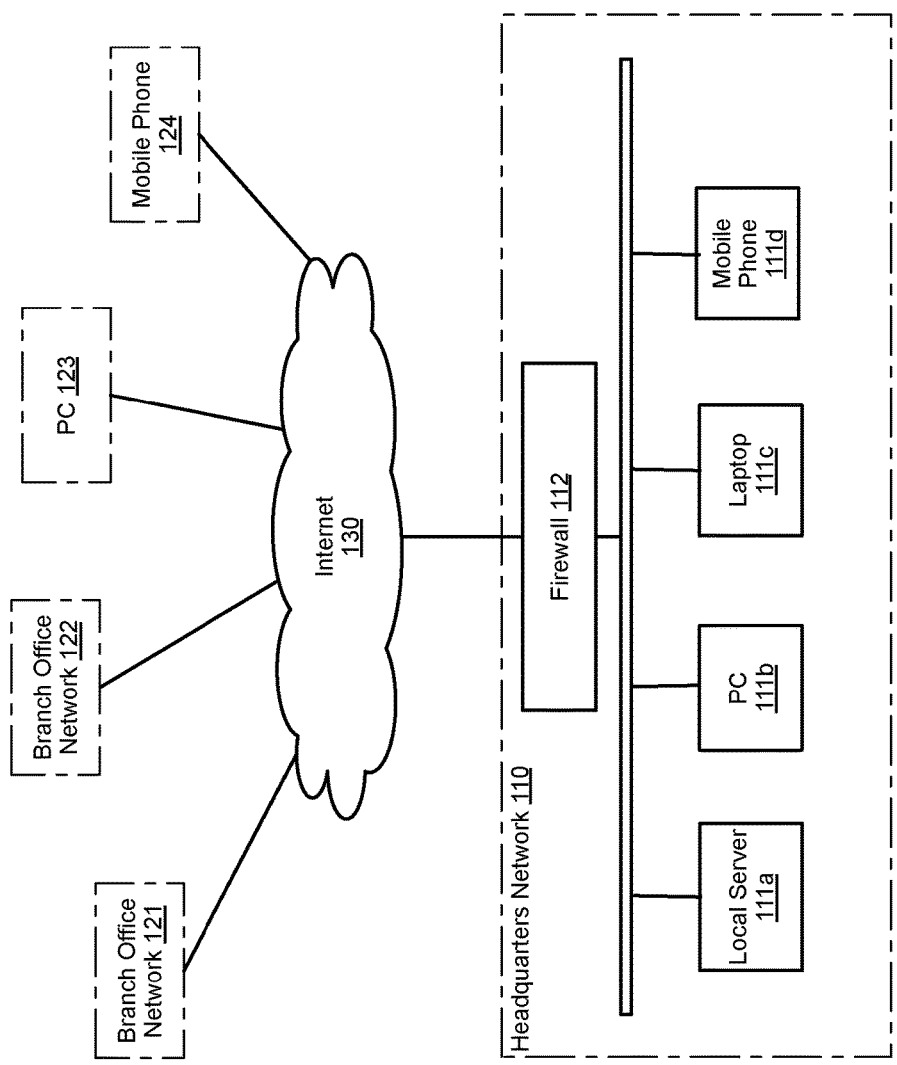
FIG. 1 illustrates an exemplary network architecture in accordance with an embodiment of the present invention.

Systems and methods are described for limiting the rate of packet transmission from a NIC to a host CPU. According to one embodiment, a NIC monitors the performance of a host CPU of a network appliance. When a data packet is received from a network, the NIC determines if the host CPU is busy. When the host CPU is busy, the transmission of the data packet to the host CPU is stopped so that the host CPU may spare some cycle for user space applications and other tasks.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

FIG. 1 illustrates an exemplary network architecture in accordance with an embodiment of the present invention. Network architecture 100 shown in FIG. 1 comprises a headquarters network 110, multiple branch office networks 121 and 122. The headquarters network 110 and branch office networks 121 and 122, PC 123 and mobile phone 124 are connected through internetworks, such as the Internet 130. Headquarters network 110 includes multiple network appliances, such as local server 111a, PC 111b, laptop 111c, mobile phone 111d and other computing devices that are operatively coupled to each other through a Local Area Network (LAN), wherein the LAN is then operatively coupled with firewall 112 which enables access to Internet 130. Firewall 112 separates the external computing environment, represented by Internet 130, from the internal computing environment of headquarters network 110. Firewall 112 may intercept communications between Internet 130 and the network appliances of headquarters network 110 and scan for malware, viruses or other high risk network accesses. The internal structures of branch office networks 121 and 122 are omitted as they may be the same as that of headquarters network 110.

In the embodiment shown in FIG. 1, firewall 112 is a rule-based security device that controls traffic going through its interfaces. Usually, firewall 112 includes multiple physical network interfaces, such as an internal interface with 4-24 or more Ethernet ports, 1-4 or more wide area network (WAN) interfaces and one demilitarized zone (DMZ) interface. Further, when the private network is separated into multiple virtual LANs (VLANs), firewall 112 may also define multiple virtual interfaces for each of the VLANs.

Firewall 112 includes a rule set with multiple rules created by the network administrator and controls the traffic going through firewall 112. In the context of each rule, traffic is typically identified by source interfaces, destination interfaces, source Internet Protocol (IP) addresses, destination IP addresses, users/user groups, devices and other parameters of the traffic. In one embodiment of the present invention, multiple interfaces of firewall 112 may be selected as the source/destination of traffic in a single rule. The multiple interfaces can include physical interfaces, virtual interfaces or zones of firewall 112. Usually, multiple interfaces that belong to the same category may be selected as a source in a rule. For example, multiple VLAN interfaces may be selected as sources/destinations of the traffic in a rule. However, different categories of interfaces may also be allowed as sources/destinations of a traffic flow in a rule. For example, an internal interface and a WAN interface or a physical interface and a virtual interface may be selected in a rule as the sources/destinations of traffic. In this scenario, a warning message may be provided to the network administrator before the rule containing multiple categories of interfaces can be stored within firewall 112. After the traffic flow is defined, an action controlling the traffic flow, such as accept or deny, is designated in each rule. In operation, all traffic going through interfaces of firewall 112 is captured by firewall 112. The source interface, destination interface and other parameters of the captured traffic flow are matched with those of each rule of a rule set. The first matched rule in the rule set is typically used for controlling the traffic flow and the traffic flow is processed based on the action defined in the matched rule.

Figure 2:
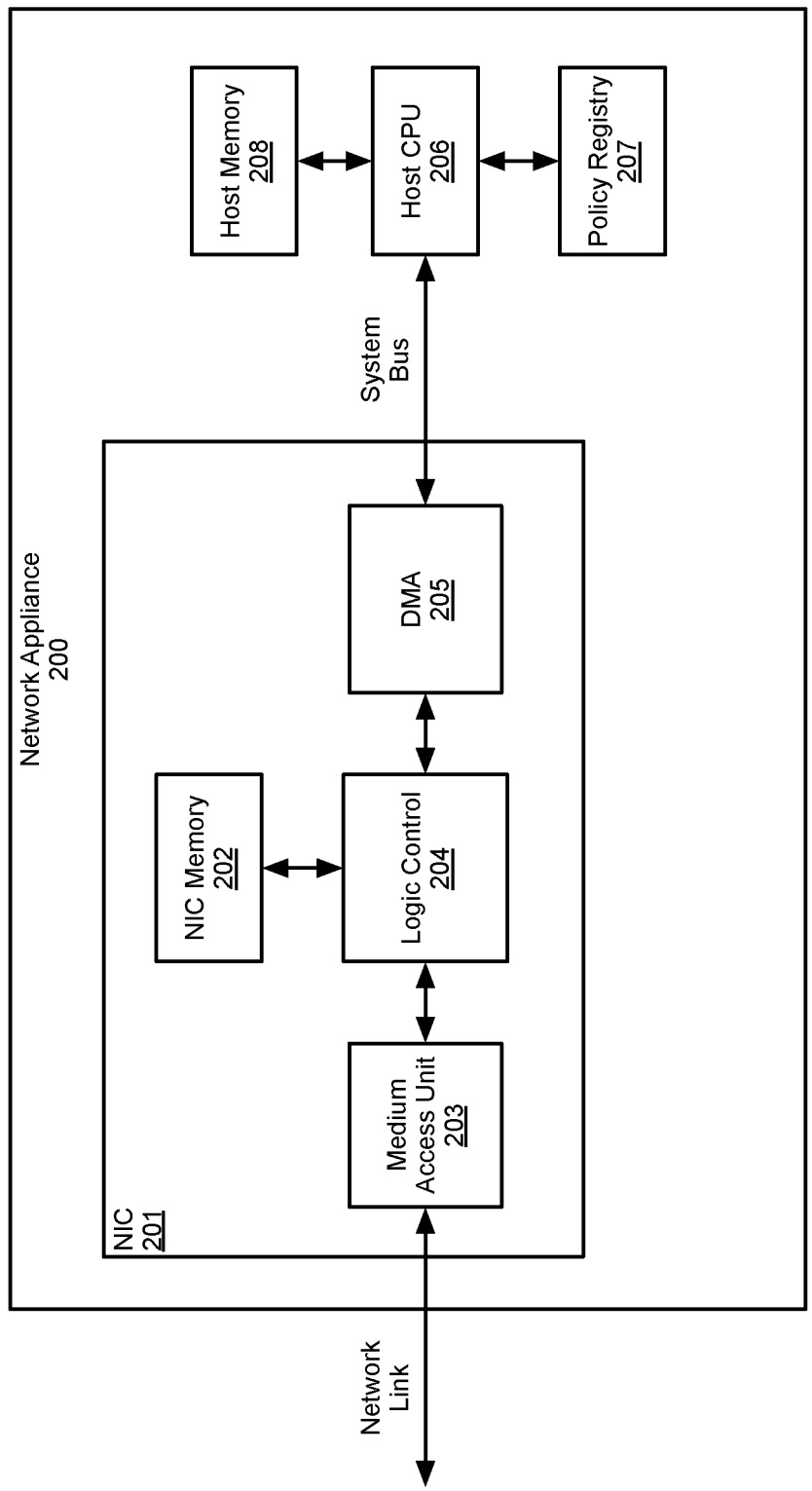
FIG. 2 illustrates exemplary functional units of a network appliance in accordance with an embodiment of the present invention.

FIG. 2 illustrates exemplary functional units of a network appliance 200 in accordance with an embodiment of the present invention. In the context of the present example, network appliance 200 includes a NIC 201, a host CPU 206, a host memory 208 and a policy registry 207. NIC 201 is connected to host CPU 206 through a bus system of network appliance 200. NIC 201 further includes a NIC memory 202, a medium access unit 203, control logic 204 and a direct memory access (DMA) 205. Control logic 204 may be one or more programmable processors that run compiled-code firmware. DMA 205 is directed by control logic 204 to read and write data between NIC memory 202 and host memory 208. A data packet may be received by medium access unit 203 from a network link, such as an Ethernet cable. NIC 201 then stores the received data packet in NIC memory 202. In some embodiments, control logic 204 of NIC 201 may issue an interrupt request to host CPU 206 for each incoming data packet to indicate the availability of a data packet for processing. In response to the interrupt, host CPU 206 fetches the incoming data packet from NIC 201. In other embodiments, interrupts are not issued for each incoming data packet. Instead, host CPU 206 can periodically check for the arrival of incoming network packets without being interrupted, which eliminates the overhead of interrupt processing. For example, CPU 206 may fetch all data packets available for processing by calling a poll method provided by a driver of NIC 201. After one or more data packets are fetched, host CPU 206 may scan each of data packets based on rules of policy registry 207 that are configured by the network administrator. If a data packet is compliant with all rules of policy registry 207, it is passed to its destination through the NIC 201. If the data packet is not compliant with one of the rules, it may be blocked from passing to its destination by NIC 201 dropping the data packet.

In order to avoid starving user space applications and/or other tasks of CPU cycles during heavy-traffic periods, according to one embodiment, control logic 204 of NIC 201 may limit the rate at which data packets are transmitted to host CPU 206 when NIC 201 detects that host CPU 206 is busy. For example, control logic 204 may detect if host CPU 206 is busy before a data packet is transmitted to host CPU 206. A host CPU state detection process implemented as a control process of NIC 201 may be continuously run as a background process, for example. An exemplary control process is described further below with reference to FIG. 3.

Whether host CPU 206 is busy can be determined by different indications. One indication that host CPU 206 is busy may be that an interrupt that has been disabled by NIC 201 after NIC 201 has sent an interrupt request to host CPU 206 has not been re-enabled by the host CPU 206 for a certain amount of time or a certain number of CPU cycles. When NIC 201 is operating in interrupt mode, NIC 201 sends an interrupt request to host CPU 206 when one or more data packets are received from the network and available for processing. Then, the interrupt is disabled by NIC 201. After receiving the interrupt, host CPU 206 processes the data packets in kernel space. After the data packets are processed, the interrupt is re-enabled by host CPU 206 in order to allow NIC 201 to again send an interrupt request when subsequent data packets are received by NIC 201. As the disabled interrupt is re-enabled only after host CPU 206 finishes the processing of data packet, a delay in connection with re-enabling the disabled interrupt may indicate host CPU 206 is busy processing data packets. As such, in one embodiment, NIC 201 may determine that host CPU 206 is busy by detecting if the disabled interrupted has yet to be re-enabled (i.e., remains disabled).

Another indication of the state of host CPU 206 may be a length of a packet queue from which host CPU 206 fetches data packets to be processed. When NIC 201 is operating in polling mode, NIC 201 places data packets received from the network onto a packet queue and host CPU 206 retrieves data packets from the packet queue for processing within a polling loop, for example. If there are no or relatively few data packets waiting in the packet queue, this condition indicates host CPU 206 is not busy as host CPU 206 is keeping up with the arrival of incoming data packets. On the other hand, if there are a relatively large number of data packets waiting in the packet queue to be processed by host CPU 206, such a condition is indicative of host CPU 206 being busy as it is not keeping pace with the arrival of incoming data packets.

In various embodiments of the present invention, when host CPU 206 is busy at a particular time or remains in a busy state for a predetermined or configurable time period, NIC 201 temporarily stops or slows the transmission of data packets to host CPU 206 for some time to allow host CPU 206 to complete processing of data packets on hand and to proactively make available some host CPU cycles for user space applications and/or other tasks. In one embodiment, upon detecting host CPU 206 is busy, NIC 201 stops the transmission of data packets to host CPU 206 until host CPU 206 is no longer busy.

It is possible that host CPU 206 may immediately become busy again and may not have sufficient cycles for user space applications and/or other tasks if NIC 201 immediately resumes transmission of data packets upon detecting host CPU 206 is not busy. Therefore, in another embodiment, NIC 201 resumes the transmission of data packets to host CPU 206 only after NIC 201 observes that host CPU 206 has not been busy for a predetermined time period or NIC 201 may wait a predetermined amount of time after detecting host CPU 206 is not busy before enabling the transmission of data packets to host CPU 206 to ensure that lower priority tasks and other applications receive some attention from host CPU 206.

In some embodiments, when NIC 201 stops the transmission of data packets to host CPU 206, data packets received by NIC 201 may be stored in a buffer to reduce the possibility of dropping data packets. Further, control logic 204 may determine the relative priorities of data packets received from the network based on the protocols of the data packets. The data packets associated with protocols of relatively higher priority, such as Open Shortest Path First (OSPF), Address Resolution Protocol (ARP), Link Aggregation Control Protocol (LACP) and the like, may be assigned higher priority over other data packets. Additionally or alternatively, the separate buffers may be employed for low and high priority packets and the high priority buffer may have more capacity to reduce the chance of high priority packets being dropped. In one embodiment, high priority data packets may be stored in a buffer and low priority data packets may be dropped by NIC 201 when NIC 201 is in a state in which it has stopped the transmission of data packets to host CPU 206. In another embodiment, NIC 201 stops only the transmission of low priority data packets when host CPU 206 is busy, but continues to transmit high priority data packets to host CPU 206.

Although only a single NIC (i.e., NIC 201) and a single CPU (i.e., host CPU 206) are shown in FIG. 2, it will be apparent to those skilled in the art that a network appliance may include multiple NICs and/or multiple CPUs and data packets received at a particular NIC may transmitted to one or more CPUs. The rate that data packets may be transmitted from a particular NIC to a particular host CPU may be controlled independently.

Figure 3:
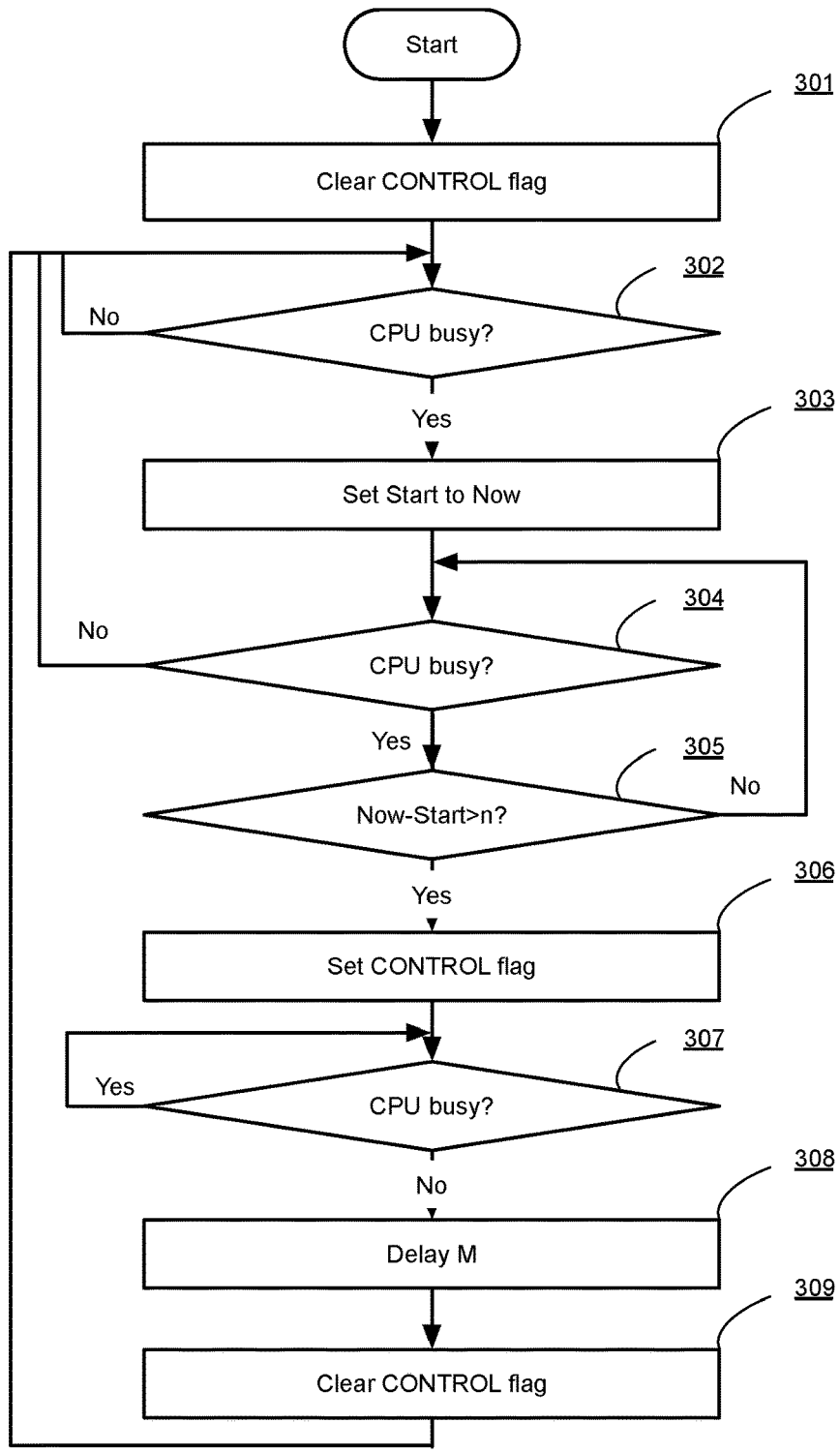
FIG. 3 is a flow diagram illustrating a control process of a NIC in accordance with an embodiment of the present invention.

FIG. 3 is a flow diagram illustrating a method for controlling data packet transmission to a host CPU based on the state of the host CPU in accordance with an embodiment of the present invention. In the present embodiment, a control flag is set in a process of the NIC when the NIC detects the host CPU is in a busy state for a predetermined or configurable time period and the control flag is cleared after the NIC detects the host CPU is in an idle state for a predetermined or configurable time period. When a data packet is received by the NIC, the NIC checks the control flag in a data transmission process to determine if data packet transmission to the host CPU should be stopped or continued based on the control flag. As such, the control flag operates as a rate limiting mode indicator that is derived based on the status of the host CPU. Exemplary data packet transmission processes are described in detail below with reference to FIGS. 5, 6 and 7.

At block 301, a control flag is cleared initially in a control process of a NIC. The NIC may begin the data packet transmission when the control flag is cleared which indicates rate limiting is inactive.

Then, at decision block 302, the NIC determines whether the host CPU is busy. As discussed above, the status of the host CPU may be determined by different indications. For example, one indication that the host CPU may be busy is that an interrupt request disabled by the NIC has not been re-enabled by the host CPU for a predetermined amount of time/cycles. Usually, after the NIC sends an interrupt request to the host CPU, the NIC then disables the interrupt and will not send an interrupt until the interrupt is re-enabled by the host CPU. The host CPU will enable the interrupt after the data packets associated with previous interrupt have been processed so that the NIC can assert the interrupt again for subsequently received data packets. Therefore, one possible way for the NIC to determine whether the host CPU is busy is by detecting whether the interrupt remains disabled for a period of time. Another potential indication of the host CPU's status is the length of a packet queue on which data packets awaiting processing by the host CPU are placed by the NIC. The NIC may place data packets received from the network on the packet queue and provide a poll method to be called by the host CPU so that pending data packets may be fetched without the overhead of interrupt processing. As discussed above, in such a polling implementation, the NIC may detect the length of the packet queue to determine if the host CPU is busy or not. If there are greater than a predetermined number of data packets in the packet queue, it can be inferred that the host CPU is busy. In one embodiment, a threshold for the length of the packet data queue may be configured so that the NIC may determine the host CPU is busy when the length of the packet queue meets or exceeds the threshold. A person or ordinary skill in the art will appreciate that other indications may be used to determine a current status of the host CPU.

If the NIC determines that the host CPU is not busy, the process goes back to check performance of the host CPU again. If the NIC determines that the host CPU is busy, processing loops back and repeats the processing of decision block 302. If the NIC determines that the host CPU is busy, processing continues with block 303.

In various embodiments, the NIC may set the control flag when the host CPU is busy and the transmission of data packets to the host CPU may be stopped if the control flag is set, meaning rate limiting is active. However, in the context of the present example, the control flag is set only when the host CPU remains in busy state for a predetermined time. As such, in this example, the NIC stops the transmission of data packets to the host CPU only after it has been observed that the host CPU has remained busy for some time period. In this manner, the NIC seeks a balance between the performance of host CPU and the possibility of packet dropping. To determine if the host CPU is in a busy state for the predetermined amount of time, in the present example, the NIC records the start time that the host CPU is first observed to be in a busy state at block 303.

At decision block 304, the NIC determines if the host CPU remains busy. If the host CPU is determined not to be busy, processing loops back to block 302 to reset the time period. If the host CPU is still busy at decision block 304, then processing continues with decision block 305.

At decision block 305, the NIC calculates the difference between the current time and the start time that the host CPU was first observed to be in a busy state (e.g., the time recorded at decision block 303). The difference between the present time and the start time is compared with a threshold, n, which is configured to be the delay for setting the control flag when the host CPU is busy. If the NIC determines that the period that host CPU has been in the busy state does not exceed the configurable threshold, n, then processing branches to decision block 304 and the NIC continues to check the status the host CPU until the threshold is exceeded and the host CPU remains in the busy state or until the host CPU is observed not to be in the busy state. If the host CPU exits the busy state before the threshold, n, then processing returns to decision block 302 to detect the beginning of the time period. If the host CPU remains in the busy state longer than the threshold, n, the NIC sets the control flag at block 306 and the transmission of data packets to the host CPU will be temporarily stopped.

Having determined that rate limiting should go into effect, in the present example, the NIC now monitors the status of the host CPU to determine when the control flag should be cleared so that the transmission of data packets to the host CPU may be resumed. The NIC may resume the transmission after a predetermined time or after the NIC detects that the host CPU is not busy. In the present embodiment, the NIC will not clear the control flag until the host CPU has been idle for a predetermined time period to ensure that the host CPU is provided the ability to service pending user space applications and/or other tasks having a lower priority than data packet processing.

At decision block 307, the NIC determines if the host CPU remains busy after the control flag has been set and rate limiting has gone into effect. If the host CPU remains busy, the NIC continues to monitor the status of host CPU by returning to the beginning of decision block 307. If the host CPU has been determined to be idle (not busy) at decision block 307, then processing continues with block 308.

At block 308, the process delays for a predetermined time, M, to ensure the host CPU will not immediately become busy again. As noted above, in alternative embodiments, rate limiting may be turned off immediately after observing the host CPU is no longer busy, however, in the present example, a configurable delay is imposed so as to ensure lower priority processes can be attended to by the host CPU. As discussed above, during high-traffic periods, it is possible for the NIC to consume all of the cycles of the host CPU with data packet processing. In such circumstances, user space applications, such as the control panel, may stop responding to user inputs/commands and user experience suffers. As such, in some embodiments, a suitable delay parameter, M, is configured so as to reserve approximately 0.1-10% of host CPU cycles for user space applications and other tasks. In this manner, user space applications are expected to remain responsive to user inputs/commands. Those skilled in the art will recognize the parameter M may be configured depending on the speed of host CPU and the amount that CPU cycles that are desired to be reserved for user space applications and other tasks.

After the delay, M, during which the host CPU has had an opportunity to attend to lower priority user space applications and/or other tasks, at block 309, the control flag is cleared to allow resumption of the transmission of data packets from the NIC to the host CPU.

Figure 4:
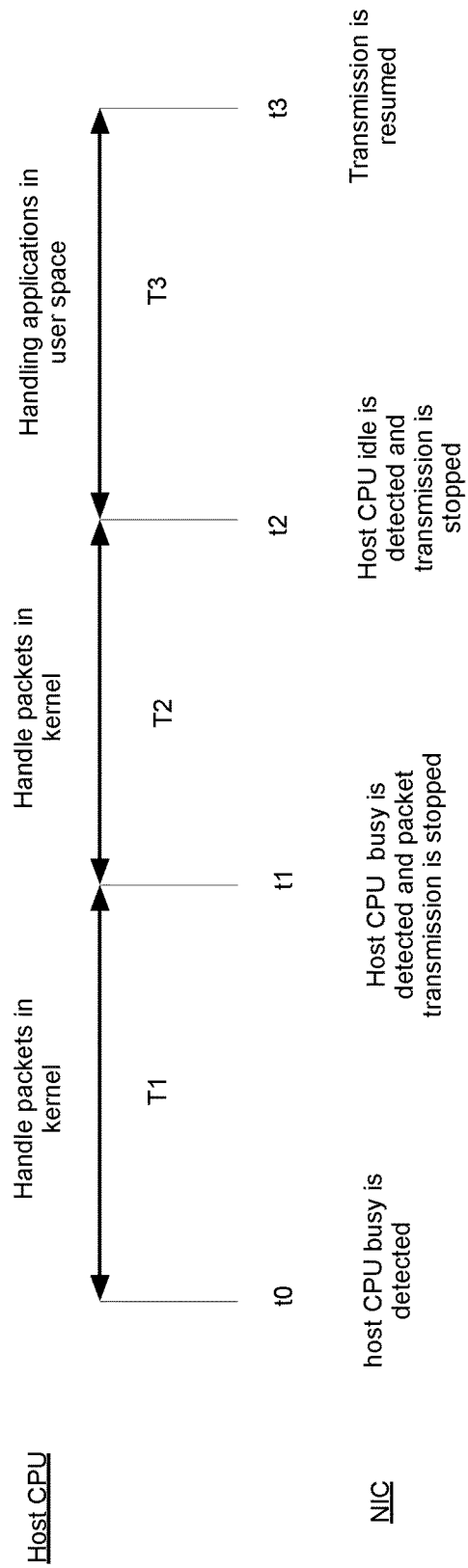
FIG. 4 is a sequence diagram illustrating states of a host CPU and a NIC during the processing of data packets in accordance with an embodiment of the present invention.

FIG. 4 is a chart illustrating the various states of a host CPU and a NIC of a network appliance in accordance with an embodiment of the present invention. When the NIC detects that the host CPU is busy for the first time (t0), the NIC does not set the control flag and instead continues to monitor the state of the host CPU. In the time period T1 (e.g., the threshold n in FIG. 3), the host CPU is processing data packets received from the NIC in the kernel. At the time t1, the NIC detects that the host CPU remains busy and the control flag is set. After the control flag is set, the transmission of data packets to the host CPU is stopped by the NIC. Next, the host CPU continues to process the data packets in kernel for a time period T2. At time t2, the NIC detects that the host CPU is not busy (i.e., idle). Although the host CPU is idle at t2, the NIC does not clear the control flag immediately. Instead, in this example, the NIC postpones the resumption of transmission of data packets for a time period T3 (e.g., the threshold M in FIG. 3) so that the host CPU has some cycles to handle user space applications and other tasks. After the host CPU has been provided with a break from processing data packets for the time T3, the NIC clears the control flag at time t3 and the NIC may resume the transmission of data packets to the host CPU.

In the present embodiment, if the parameter T1 is zero, the NIC will stop the transmission of data packets whenever the host CPU is observed to be busy. This may transmission of data packets from the NIC to the host CPU to stop too often and overall data packet throughput may be impacted. The parameter T1 is used for adjusting the possibility that data packets will be dropped when the host CPU is busy. The parameter T1 may be configured based on the speed of the host CPU.

In the present embodiment, if the parameter T3 is zero, the NIC will resume the transmission of data packets immediately after the host CPU is observed to be idle. During high-traffic periods, this may cause the host CPU to quickly return to the busy state as a result of handling the data packets received from the NIC. If the host CPU goes back to busy state too soon, there might be not enough cycles for user space applications and other tasks even if the transmission of data packets are stopped when the host CPU is later observed to be busy again. A suitable parameter T3 ensures the host CPU has sufficient cycles for user space applications and other tasks. A suitable parameter T3 may be configured based on the speed of the host CPU so that the host CPU has enough cycles for user space applications and other tasks but without significantly impacting throughput of data packets.

Figure 5:
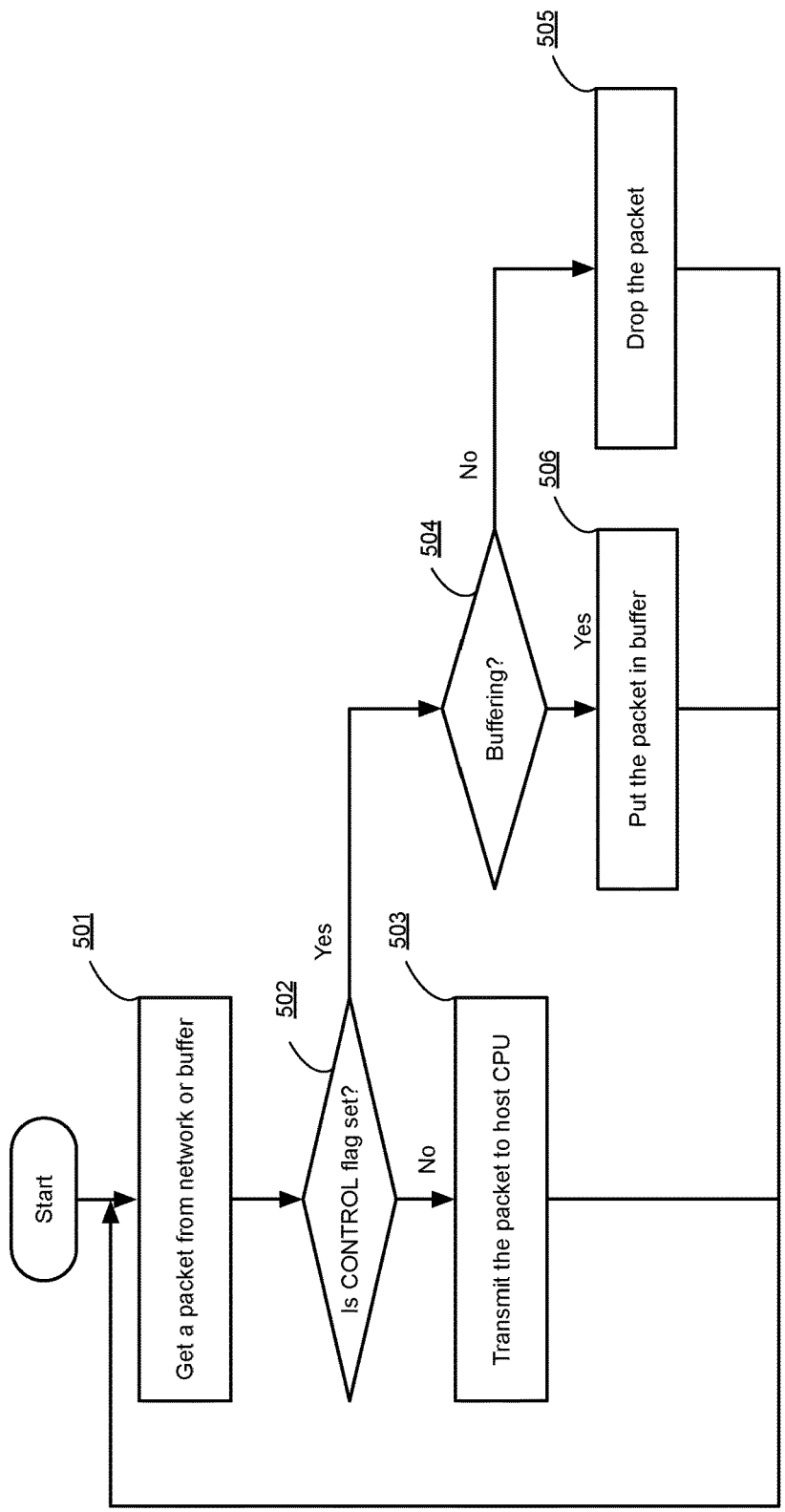
FIG. 5 is a flow diagram illustrating a packet transmission process of a NIC in accordance with an embodiment of the present invention.

FIG. 5 is a flow diagram illustrating a method for controlling the transmission of a data packet from a NIC to a host CPU in accordance with an embodiment of the present invention. In this embodiment, the NIC includes one or more buffers for buffering data packets when rate limiting is in effect and data packets are not being transmitted to the host CPU. In this manner, the possibility of dropping data packets is lessened as the data packets stored in the buffer may be transmitted by the NIC when rate limiting is lifted.

At block 501, a NIC of a network appliance receives a data packet from the network. If a packet buffer is configured for the delayed data packets, the NIC may fetch data packets from the buffer and try to transmit the data packets again.

At block 502, the NIC checks if a control flag is set or not. The control flag may be set or cleared in a separate process of the NIC depending on the status of the host CPU as described with reference to FIG. 3.

If the control flag is not set, the received data packet may be transmitted to the host CPU at block 503. The transmission of data packet to the host CPU may be implemented based on the configuration of NIC. The NIC may send an interrupt through a dedicate line to the host CPU to indicate the availability of the incoming data packet for processing by the host CPU. Alternatively, the NIC may signal an interrupt using special in-band messages according to the Message Signaled Interrupts (MSI) standard. The host CPU may fetch the data packet when responding to the interrupt. If the network appliance supports New API (NAPI), the NIC may store data packets received from the network to a data packet queue and provide a poll method to the host CPU and the host CPU may call the poll method to fetch the data packets without interrupt.

If the control flag is determined to be set at decision block 502, the NIC determines if a buffer is available at decision block 504. If a buffer is configured in the network appliance and sufficient buffer space is available, the data packet is put in the buffer at block 506. In this manner, the probability of a data packet being dropped is lessened during the time that the transmission of the data packets to the host CPU is stopped. The NIC may try to resume transmission of the date packets stored in the buffer at block 501. If a buffer is not available or insufficient buffer space is available, the data packet received from the network is dropped at block 505.

After the data packet is transmitted, buffered or dropped, the process loops back to block 501 and the NIC may wait for a next incoming data packet or try to send previously buffered data packets.

Figure 6:
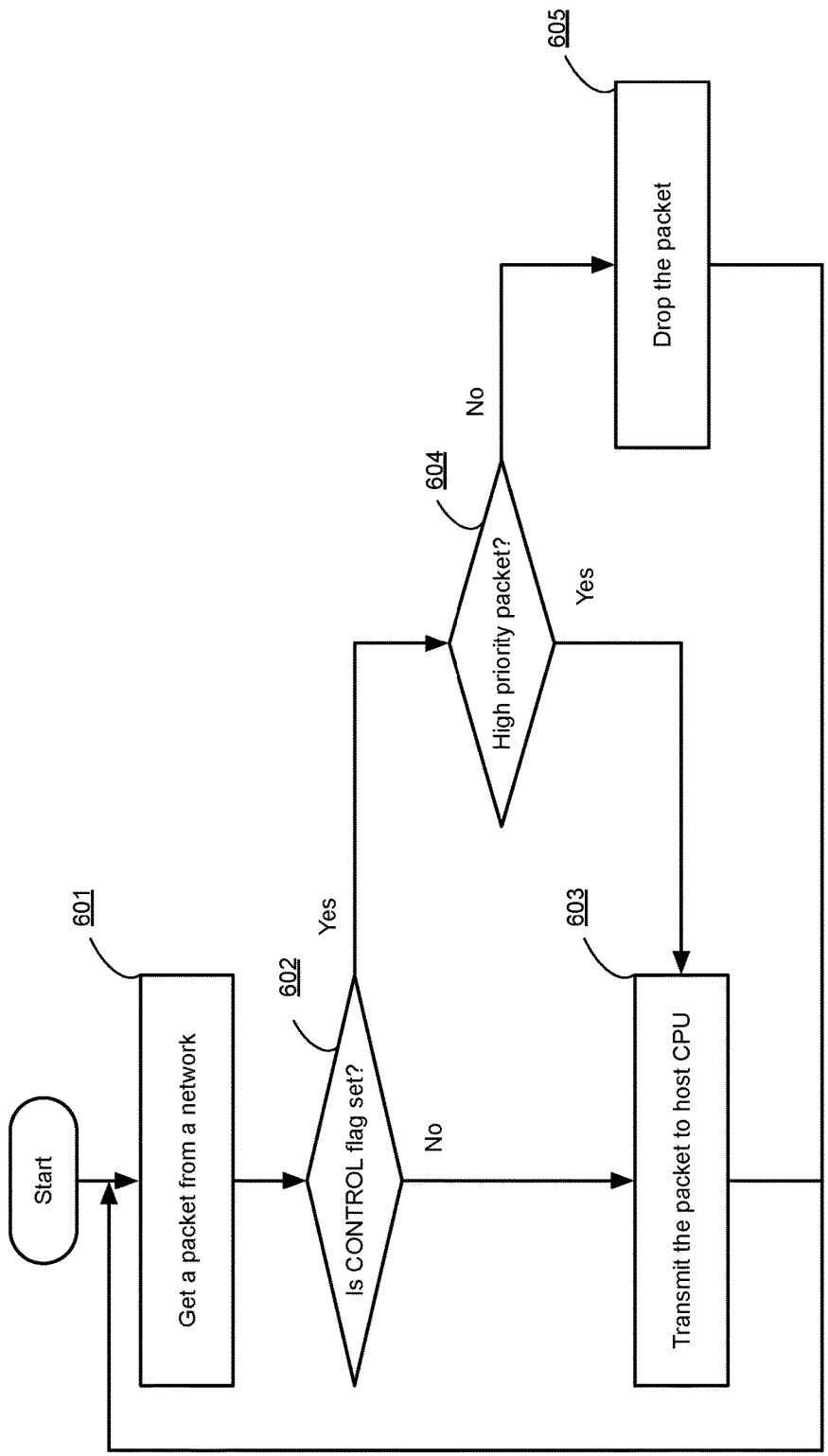
FIG. 6 is a flow diagram illustrating a packet transmission process of a NIC in accordance with another embodiment of the present invention.

FIG. 6 is a flow diagram illustrating another method for controlling the transmission of a data packet from a NIC to a host CPU with rate limiting in accordance with an embodiment of the present invention. In this embodiment, the NIC does not have a buffer for data packets that are not transmitted immediately to the host CPU. As such, in the context of the present example, data packets with lower priorities that cannot be immediately transmitted to the host CPU (e.g., when rate limiting is in effect) are dropped and data packets with higher priorities continue to be transmitted to the host CPU even though the host CPU is known to be busy.

At block 601, a NIC of a network appliance receives a data packet from the network.

At decision block 602, the NIC checks if a control flag is set or not. The control flag may be set or cleared in another process of the NIC depending on the state of the host CPU as described with reference in FIG. 3, for example.

If the control flag is not set, the received data packet may be transmitted to the host CPU at block 603. If the control flag is determined to be set at decision block 602, the NIC determines if the priority of the data packet is higher than a predetermined or configurable threshold. The priority of the data packet may be determined based on the protocol of the data packet, for example. Data packets associated with certain protocols, such as Open Shortest Path First (OSPF), Address Resolution Protocol (ARP), Link Aggregation Control Protocol (LACP) and the like, may be assigned high priority.

If the priority of the data packet is lower than a predetermined or configurable threshold, at block 605, the NIC drops the data packet without sending it to the host CPU so that the host CPU is provided with spare cycles for user space applications and other tasks.

If the priority of the data packet is higher than the threshold, in the context of the present example, it means that the data packet is required to be processed without delay. The process branches to block 603 and the high priority data packet is transmitted to the host CPU despite the host CPU being busy.

After the data packet is transmitted or dropped, the process returns to block 601 and the NIC waits for a next incoming data packet.

Figure 7:
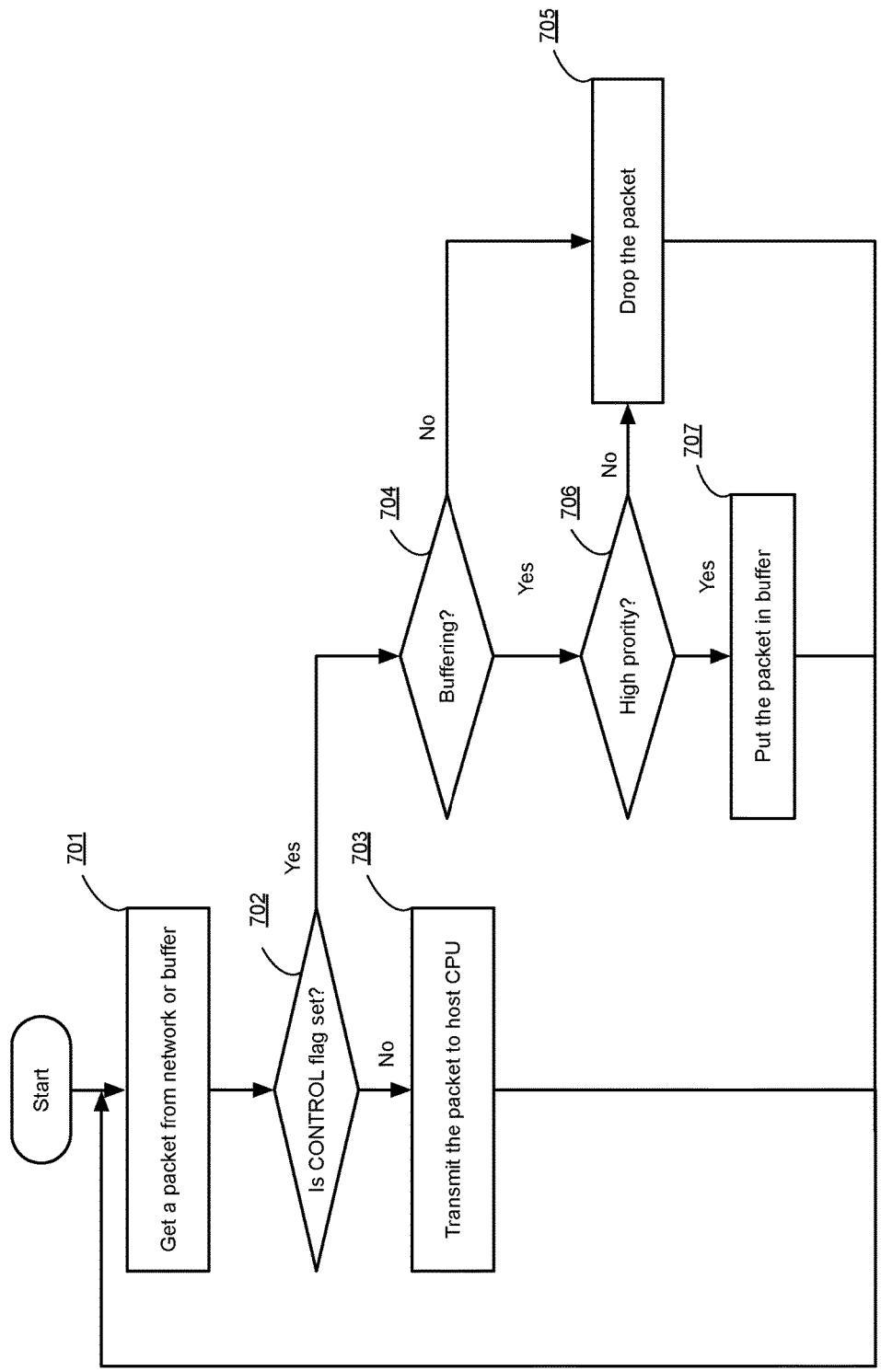
FIG. 7 is a flow diagram illustrating a packet transmission process of a NIC in accordance with a further embodiment of the present invention.

FIG. 7 is a flow diagram illustrating a further method for controlling the transmission of a data packet from a NIC to a host CPU with rate limiting in accordance with an embodiment of the present invention. In this embodiment, the NIC includes a buffer for high priority data packets that cannot be immediately transmitted to the host CPU. However, data packets with lower priorities are dropped when rate limiting is in effect. In this manner, high priority data packets may be buffered so that they may be transmitted to the host CPU when rate limiting is lifted and such transmission is allowed.

At block 701, a NIC of a network appliance receives a data packet from the network. If a buffer is configured for the delayed data packets, the NIC may fetch data packets from the buffer and try to transmit the data packets again.

At decision block 702, the NIC checks if a control flag is set or not. The control flag may be set or cleared in another process of the NIC depending on the status of the host CPU as described with reference to FIG. 3.

If the control flag is not set, the received data packet may be transmitted to the host CPU at block 703. If the control flag is set at block 702, the NIC determines if a buffer is available at block 704. If a buffer is not available or insufficient buffer space is available, the data packet received from the network is dropped at block 705. If a buffer is configured in the network appliance and sufficient buffer space is available at block 704, the NIC determines if the priority of the data packet is higher than a predetermined or configurable threshold at decision block 706. In one embodiment, the priority of the data packet may be determined based on the protocol of the data packet. If the priority of the data packet is lower than the threshold, the process continues with block 705 and the NIC drops the data packet so that the host CPU may spare some cycles for user space applications and other tasks. If the priority of the data packet is higher than the threshold, the data packet is put in the buffer at block 707. The data packets with higher priorities are not dropped during the time that CPU is busy handling the data packet or handling user space applications and other tasks. The NIC has an opportunity to send the data packets stored in the buffer when it returns to block 701.

After the data packet is transmitted, buffered or dropped, the process returns to block 701 and the NIC may wait for a next incoming data packet or try to send any buffered data packets.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:
1. A method comprising:
receiving, by a network interface card (NIC) of a network security device, data packets from or directed to a private network protected by the network security device, wherein the NIC is coupled to a host central processing unit (CPU) of the network security device through a bus;

monitoring, by the NIC, a status of the host CPU, including:
responsive to receiving a data packet, notifying the host CPU the data packet is available for processing by the host CPU, by issuing, by the NIC, an interrupt to the host CPU;
disabling, by the NIC, the interrupt;
measuring, by the NIC, a time period during which the interrupt remains disabled by monitoring the interrupt; and
determining, by the NIC, the host CPU is busy when the time period exceeds a predetermined or configurable time threshold;

setting, by the NIC, a rate limiting mode indicator based on the status;
when the rate limiting mode indicator indicates rate limiting is inactive, then causing, by the NIC, the host CPU to perform one or more high priority tasks in relation to the received data packets within a kernel of an operating system of the host CPU by delivering or making available the received data packets to the host CPU; and
when the rate limiting mode indicator indicates rate limiting is active, then avoiding starving of one or more lower priority tasks of host CPU cycles by, the NIC, temporarily stopping or slowing said delivering or making available the received data packets to the host CPU.

2. The method of claim 1, wherein said monitoring, by the NIC, a status of the host CPU further comprises:
monitoring, by the NIC, a length of a data packet queue maintained by the NIC, wherein the data packet queue is used for storing those of the received data packets that cannot be immediately processed by the host CPU; and
determining, by the NIC, the host CPU is busy when the length exceeds a predetermined or configurable length threshold.

3. The method of claim 1, further comprising:
after determining the host CPU is busy, continuing to monitor, by the NIC, the interrupt; and
when the interrupt is observed to be re-enabled, then:
determining, by the NIC, the host CPU is no longer busy; and
resuming said delivering or making available the received data packets to the host CPU after a predetermined or configurable amount of time, thereby allowing the host CPU to perform the one or more lower priority tasks.

4. The method of claim 2, further comprising:
after determining the host CPU is busy, continuing to monitor, by the NIC, the length of the data packet queue; and
when the length is equal to or less than the predetermined or configurable length threshold, then:
determining, by the NIC, the host CPU is no longer busy; and
resuming said delivering or making available the received data packets to the host CPU after a predetermined or configurable amount of time, thereby allowing the host CPU to perform the one or more lower priority tasks.

5. The method of claim 1, wherein said setting a rate limiting mode indicator based on the status is performed by a first process running on the NIC and wherein said delivering or making available the received data packets to the host CPU and said rate limiting is performed by a second process running on the NIC.

6. The method of claim 1, wherein said temporarily stopping or slowing said delivering or making available the received data packets to the host CPU comprises buffering, by the NIC, the received data packets.

7. The method of claim 1, further comprising:
determining, by the NIC, a relative priority of each of the received data packets; and
wherein said temporarily stopping or slowing said delivering or making available the received data packets to the host CPU comprises (i) buffering, by the NIC, those of the received data packets determined to have a relatively high priority; and (ii) dropping, by the NIC, those of the received data packets determined to have a relatively low priority.

8. The method of claim 7, wherein said determining a relative priority of each of the received data packets is based on a protocol associated with the received data packets.

9. The method of claim 1, wherein the network security device comprises unified threat management (UTM) appliance, a firewall device or a gateway device.

10. The method of claim 9, wherein the one or more high priority tasks include performing security scanning on the received data packets.

11. The method of claim 9, wherein the one or more low priority tasks include execution of a user space application.

12. A programmable network interface controller (NIC) of a network security device comprising:
a non-transitory storage device having embodied therein instructions representing a processor status monitoring routine and a packet delivery routine; and
one or more processors coupled to the non-transitory storage device and operable to execute the processor status monitoring routine and the packet delivery routine to perform a method comprising:
receiving data packets from or directed to a private network protected by the network security device, wherein the NIC is coupled to a host central processing unit (CPU) of the network security device through a bus;
monitoring, by the processor status monitoring routine, a status of the host CPU, including:
responsive to receiving a data packet, notifying the host CPU the data packet is available for processing by the host CPU, by issuing an interrupt to the host CPU;
disabling the interrupt;
measuring a time period during which the interrupt remains disabled by monitoring the interrupt; and
determining the host CPU is busy when the time period exceeds a predetermined or configurable time threshold;
setting, by the processor status monitoring routine, a rate limiting mode indicator based on the status;
when the rate limiting mode indicator indicates rate limiting is inactive, then causing, by the packet delivery routine, the host CPU to perform one or more high priority tasks in relation to the received data packets within a kernel of an operating system of the host CPU by delivering or making available the received data packets to the host CPU; and
when the rate limiting mode indicator indicates rate limiting is active, then avoiding starving of one or more lower priority tasks of host CPU cycles by, the packet delivery routine, temporarily stopping or slowing said delivering or making available the received data packets to the host CPU.

13. The programmable NIC of claim 12, wherein said monitoring, by the processor status monitoring routine, a status of the host CPU further comprises:
- monitoring a length of a data packet queue maintained by the NIC, wherein the data packet queue is used for storing those of the received data packets that cannot be immediately processed by the host CPU; and
- determining the host CPU is busy when the length exceeds a predetermined or configurable length threshold.

14. The programmable NIC of claim 12, further comprising:
- after determining the host CPU is busy, continuing to monitor, by the processor status monitoring routine, the interrupt; and
- when the interrupt is observed to be re-enabled, then:
  - determining the host CPU is no longer busy; and
  - resuming said delivering or making available the received data packets to the host CPU after a predetermined or configurable amount of time, thereby allowing the host CPU to perform the one or more lower priority tasks.

15. The programmable NIC of claim 13, wherein the method further comprises:
- after determining the host CPU is busy, continuing to monitor, by the processor status monitoring routine, the length of the data packet queue; and
- when the length is equal to or less than the predetermined or configurable length threshold, then:
  - determining the host CPU is no longer busy; and
  - resuming said delivering or making available the received data packets to the host CPU after a predetermined or configurable amount of time, thereby allowing the host CPU to perform the one or more lower priority tasks.

16. The programmable NIC of claim 12, wherein the method further comprises:
- determining, by the packet delivery routine, a relative priority of each of the received data packets based on a protocol associated with the received data packets; and
- wherein said temporarily stopping or slowing said delivering or making available the received data packets to the host CPU comprises (i) buffering those of the received data packets determined to have a relatively high priority; and (ii) dropping those of the received data packets determined to have a relatively low priority.

17. The programmable NIC of claim 12, wherein the network security device comprises unified threat management (UTM) appliance, a firewall device or a gateway device.

18. The programmable NIC of claim 17, wherein the one or more high priority tasks include performing security scanning on the received data packets and wherein the one or more low priority tasks include execution of a user space application.

19. A method comprising:
- receiving, by a network interface card (NIC) of a network security device, data packets from a private network protected by the network security device, wherein the NIC is coupled to a host central processing unit (CPU) of the network security device through a bus;
- monitoring, by the NIC, a status of the host CPU;
- setting, by the NIC, a rate limiting mode indicator based on the status;
- when the rate limiting mode indicator indicates rate limiting is inactive, then causing, by the NIC, the host CPU to perform one or more high priority tasks in relation to the received data packets within a kernel of an operating system of the host CPU by delivering or making available the received data packets to the host CPU;
- when the rate limiting mode indicator indicates rate limiting is active, then avoiding starving of one or more lower priority tasks of host CPU cycles by, the NIC, temporarily stopping or slowing said delivering or making available the received data packets to the host CPU; and
- wherein said setting a rate limiting mode indicator based on the status is performed by a first process running on the NIC and wherein said delivering or making available the received data packets to the host CPU and said rate limiting is performed by a second process running on the NIC.

20. The method of claim 19, wherein said monitoring, by the NIC, a status of the host CPU further comprises:
- monitoring, by the NIC, a length of a data packet queue maintained by the NIC, wherein the data packet queue is used for storing those of the received data packets that cannot be immediately processed by the host CPU; and
- determining, by the NIC, the host CPU is busy when the length exceeds a predetermined or configurable length threshold.

21. The method of claim 20, further comprising:
- after determining the host CPU is busy, continuing to monitor, by the NIC, the length of the data packet queue; and
- when the length is equal to or less than the predetermined or configurable length threshold, then:
  - determining, by the NIC, the host CPU is no longer busy; and
  - resuming said delivering or making available the received data packets to the host CPU after a predetermined or configurable amount of time, thereby allowing the host CPU to perform the one or more lower priority tasks.

22. The method of claim 19, wherein said temporarily stopping or slowing said delivering or making available the received data packets to the host CPU comprises buffering, by the NIC, the received data packets.

23. The method of claim 19, further comprising:
- determining, by the NIC, a relative priority of each of the received data packets; and
- wherein said temporarily stopping or slowing said delivering or making available the received data packets to the host CPU comprises (i) buffering, by the NIC, those of the received data packets determined to have a relatively high priority; and (ii) dropping, by the NIC, those of the received data packets determined to have a relatively low priority.

24. The method of claim 23, wherein said determining a relative priority of each of the received data packets is based on a protocol associated with the received data packets.

25. The method of claim 19, wherein the network security device comprises unified threat management (UTM) appliance, a firewall device or a gateway device.

26. The method of claim 25, wherein the one or more high priority tasks include performing security scanning on the received data packets.

27. The method of claim 25, wherein the one or more low priority tasks include execution of a user space application.

* * * * *